US009616379B2

(12) United States Patent
Ryi et al.

(10) Patent No.: US 9,616,379 B2
(45) Date of Patent: Apr. 11, 2017

(54) METHOD FOR PREPARING HYDROGEN SEPARATION MEMBRANE AND DEVICE FOR PREPARING HYDROGEN SEPARATION MEMBRANE

(71) Applicant: Korea Institute of Energy Research, Daejeon (KR)

(72) Inventors: Shin Kun Ryi, Daejeon (KR); Beom Seok Seo, Daejeon (KR); Jong Soo Park, Daejeon (KR); Dong Wook Lee, Daejeon (KR); Sung Wook Lee, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 10 days.

(21) Appl. No.: 14/341,453

(22) Filed: Jul. 25, 2014

(65) Prior Publication Data

US 2015/0027307 A1    Jan. 29, 2015

(30) Foreign Application Priority Data

Jul. 25, 2013   (KR) .................. 10-2013-0088335
Aug. 21, 2013  (KR) .................. 10-2013-0098888
Sep. 3, 2013   (KR) .................. 10-2013-0105607

(51) Int. Cl.
*B01D 53/22*     (2006.01)
*B01D 67/00*     (2006.01)
(Continued)

(52) U.S. Cl.
CPC ....... *B01D 53/228* (2013.01); *B01D 67/0069* (2013.01); *B01D 67/0072* (2013.01);
(Continued)

(58) Field of Classification Search
CPC ............. B01D 53/228; B01D 67/0069; B01D 67/0072; B01D 67/0083; B01D 67/0086;
(Continued)

(56) References Cited

U.S. PATENT DOCUMENTS

2002/0020298 A1* 2/2002 Drost ................... B01D 53/228
                                                        96/11
2004/0237780 A1* 12/2004 Ma ........................ B01D 53/22
                                                        95/55

(Continued)

FOREIGN PATENT DOCUMENTS

JP      11-286785       10/1999
JP      2003-62438      3/2003
(Continued)

*Primary Examiner* — Jason M Greene
(74) *Attorney, Agent, or Firm* — Hovey Williams LLP

(57) ABSTRACT

The present invention relates to a method for preparing a hydrogen separation membrane capable of preventing the plating of Pd inside a porous support and a porous shielding layer when a separation membrane is prepared; a hydrogen separation membrane prepared therefrom; and a use thereof. In addition, the present invention relates to a device for preparing a hydrogen separation membrane; and a method for preparing a hydrogen separation membrane using the device, and in particular, relates to a device for preparing a hydrogen separation membrane capable of stably growing a Pd-containing separation membrane for hydrogen gas separation as a plating solution grows from the upper surface of a porous support to a uniform thickness by simply shielding the lower surface of the porous support when a hydrogen separation membrane is prepared using an electroless plating method. Furthermore, the present invention relates to a device for preparing a hydrogen separation membrane, and in particular, relates to a device for preparing a hydrogen separation membrane capable of stably growing a composite membrane for hydrogen gas separation as a plating solution
(Continued)

grows from the top of a porous support to a uniform thickness by simply shielding the bottom of the porous support.

8 Claims, 10 Drawing Sheets

(51) Int. Cl.
 *B01D 71/02* (2006.01)
 *B01D 69/10* (2006.01)
 *C01B 3/56* (2006.01)
 *C01B 3/50* (2006.01)

(52) U.S. Cl.
 CPC ............ *B01D 71/022* (2013.01); *C01B 3/505* (2013.01); *B01D 2256/16* (2013.01); *B01D 2257/102* (2013.01); *B01D 2257/502* (2013.01); *B01D 2257/504* (2013.01); *B01D 2257/7025* (2013.01); *B01D 2257/80* (2013.01); *Y02C 10/10* (2013.01); *Y02C 20/20* (2013.01); *Y02P 20/152* (2015.11); *Y02P 20/156* (2015.11); *Y10T 29/49826* (2015.01)

(58) Field of Classification Search
 CPC ...... B01D 69/06; B01D 69/10; B01D 71/022; B01D 2256/16; B01D 2257/108; C01B 3/503; C01B 3/505
 See application file for complete search history.

(56) References Cited

U.S. PATENT DOCUMENTS

| | | | | |
|---|---|---|---|---|
| 2005/0239646 | A1* | 10/2005 | Hada | B41M 5/42 503/200 |
| 2006/0174767 | A1* | 8/2006 | Noda | B01D 53/228 96/11 |
| 2009/0130477 | A1* | 5/2009 | Hou | B01D 53/228 428/613 |
| 2010/0313754 | A1 | 12/2010 | Okada et al. | |
| 2011/0042822 | A1* | 2/2011 | Nishizawa | H01L 21/28575 257/774 |
| 2012/0006194 | A1* | 1/2012 | Falconer | B01D 53/228 95/51 |
| 2014/0251131 | A1* | 9/2014 | Way | B01D 71/022 95/56 |
| 2015/0020686 | A1 | 1/2015 | Park et al. | |

FOREIGN PATENT DOCUMENTS

| | | |
|---|---|---|
| KR | 10-0312069 B1 | 11/2001 |
| KR | 10-2009-0092532 | 9/2009 |
| KR | 10-2009-0110897 | 10/2009 |
| KR | 10-2011-0049707 | 5/2011 |
| KR | 10-2013-0081945 | 7/2013 |

* cited by examiner

SUPPORT      Pd nuclei seeding      PETENRATION OF PLATING
                                    SOLUTION TO LOWER SURFACE OF
                                    SUPPORT AND GROWTH OF Pd OR
                                    Pd ALLOY IN BOTH DIRECTIONS SUPPORT   Pd nuclei seeding   SHIELDING LOWER    GROWTH OF         REMOVING SHIELDING
                              SURFACE OF SUPPORT  Pd OR Pd ALLOY IN   MATERIAL AT
                                                  UPPER DIERECTION   LOWER SURFACE

100

100

METHOD FOR PREPARING HYDROGEN SEPARATION MEMBRANE AND DEVICE FOR PREPARING HYDROGEN SEPARATION MEMBRANE

RELATED APPLICATIONS

This application claims priority to Korean Patent Application No. 10-2013-0088335, filed on Jul. 25, 2013; Korean Patent Application No. 10-2013-0098888, filed on Aug. 21, 2013; and Korean Patent Application No. 10-2013-0105607, filed on Sep. 3, 2013. Each of the foregoing applications is incorporated by reference herein.

FIELD OF THE INVENTION

The present invention relates to a method for preparing a hydrogen separation membrane capable of preventing the plating of Pd inside a porous support and a porous shielding layer when a separation membrane is prepared; a hydrogen separation membrane prepared therefrom; and a use thereof.

In addition, the present invention relates to a device for preparing a hydrogen separation membrane; and a method for preparing a hydrogen separation membrane using the device, and in particular, relates to a device for preparing a hydrogen separation membrane capable of stably growing a Pd-containing separation membrane for hydrogen gas separation as a plating solution grows from the upper surface of a porous support to a uniform thickness by simply shielding the lower surface of the porous support when a hydrogen separation membrane is prepared using an electroless plating method.

Furthermore, the present invention relates to a device for preparing a hydrogen separation membrane, and in particular, relates to a device for preparing a hydrogen separation membrane capable of stably growing a composite membrane for hydrogen gas separation as a plating solution grows from the top of a porous support to a uniform thickness by simply shielding the bottom of the porous support.

BACKGROUND OF THE INVENTION

Hydrogen receives attention as the main future energy source capable of replacing existing energy since hydrogen is light-weight, abundant and environmentally superior. Normally, $H_2$ is prepared using a reforming and/or a water-gas shift reaction of hydrocarbon fuels, and is used as a raw material of chemical synthesis, reducing gas in a semiconductor manufacturing process, and a fuel of fuel cells after being separated from other reformates or reactant gas. In other words, hydrogen obtained from hydrogen-including resources such as water, natural gas, coals or biomass includes impurities, and thereby needs to be separated and purified prior to use.

As methods for preparing and purifying hydrogen, a large number of technologies such as a cryogenic separation method, an adsorption method or a hydrogen separation method using a separation membrane have been proposed. Of these, a hydrogen separation method using a separation membrane has been widely used since the method has advantages in that the method saves more energy compared to other hydrogen separation methods, the operation is simple, the devices used in the method can be miniaturized, and the like.

A separation membrane used for purifying ultrapure hydrogen is a foil-formed palladium or a palladium alloy membrane, and it causes low hydrogen permeability due to the large thickness, therefore, in order to improve this problem, studies are under progress mainly focusing on coating a thin palladium or a palladium alloy membrane on a porous support, thereby improving the selective permeability of the membrane.

A palladium-based metal separation membrane has high hydrogen permeability and excellent hydrogen separability. In addition, a hydrogen separation membrane using a palladium-based metal separation membrane may prepare pure hydrogen useful for fuel cells or other hydrogen-consuming processes, and may be variously applied such as being used in a hydrogenation or a dehydrogenation reaction process in order to improve the quantity of target products.

In the process of hydrogen being separated from a palladium-based metal separation membrane, hydrogen molecules ($H_2$) are diffused to the surface of a Pd metal membrane, and the hydrogen molecules are adsorbed to the surface of the Pd metal membrane, and the adsorbed hydrogen molecules are dissociated, and after the dissociated hydrogen atoms (H) are diffused through the Pd metal membrane lattice, hydrogen molecules are regenerated, and when the hydrogen molecules are regenerated, the hydrogen molecules are desorbed from the surface of the Pd metal membrane. Hydrogen is separated through this process. The operating temperature of a hydrogen separation membrane normally ranges from 300 to 500° C.

In a palladium-based metal separation membrane, the amount of hydrogen permeation is mainly determined by hydrogen partial pressure P1 on the raw material side, and hydrogen partial pressure P2 on the purified side, a membrane thickness t of the palladium-based metal separation membrane, and a membrane area of this metal separation membrane. In other words, the amount of hydrogen permeation per unit area Q has a relation of $Q = A \cdot t^{-1} \cdot (\sqrt{P1} - \sqrt{P2})$. In the equation, A is different depending on the types of a metal membrane, operating conditions or the like.

As seen from the above equation, in order to improve the performances of the hydrogen permeation membrane, that is, to improve the amount of hydrogen permeation per unit area, I. developing an alloy having a large integer A that is different depending on the types of an alloy, II. thinning the hydrogen permeation membrane, or III. enlarging the partial pressure difference of hydrogen, may be considered. In a palladium alloy based-hydrogen permeation membrane, a method of improving hydrogen permeability by thinning the membrane is usually considered. However, when the membrane becomes thin, the mechanical strength becomes weak. The amount of hydrogen permeation is affected by partial pressure differences of hydrogen, therefore, thinning and strengthening are both required. Accordingly, a palladium alloy having a thin membrane is used in combination with a porous support in order to supplement the mechanical strength. However, methods for preparing a hydrogen separation membrane, which coat a palladium alloy on existing porous supports, may prepare a thin palladium alloy membrane, however, there are problems in that pin holes are easily formed, and hydrogen permeability is reduced by palladium or a palladium alloy being plated inside a porous support. As one example, when a palladium or palladium alloy membrane is formed by supplying a plating solution on a porous support, the plating solution penetrates through the lower surface of a metal support, or the plating solution introduced to the upper surface of the support readily penetrates inside since the lower surface of the porous support is open, and therefore, there is a problem of the palladium or palladium alloy layer growing even to the inside of the support.

In addition, when a metal separation membrane is directly formed on the surface of a porous support made of metals among porous supports, hydrogen permeability may be reduced due to mutual diffusion, therefore, a shielding layer made of ceramic is placed between the porous support and the metal separation membrane. As methods forming such a shielding layer, a sol-gel method or a sputtering method is used.

Meanwhile, as existing documents that provide technological descriptions relating to a palladium or palladium alloy composite membrane for hydrogen gas separation and a preparation method thereof, Korean Patent Number 10-0312069 may be included as an example. The above patent provides a method for forming a palladium alloy composite membrane for hydrogen gas separation in which a silica thin film layer is formed between a porous metal support and a plating layer of the palladium alloy, wherein the method includes a process of forming the plating layer of a palladium alloy on the other side of the support while depressurizing one side of the support in which the silica thin film layer is formed.

In the relating document described above, a composite membrane for hydrogen gas separation having thermal and chemical stability between metals on a porous support and at the same time, having a high hydrogen permeability coefficient and separation efficiency is provided, and a preparation method thereof, is provided, however, measures capable of stably and simply preparing a composite membrane for hydrogen gas separation with a uniform thickness on a porous support are not specifically described.

SUMMARY OF THE INVENTION

The inventors of the present invention have discovered that, when a Pd-containing separation membrane is formed on one surface of a porous support using an electroless plating method, Pd is not plated on the porous support and a porous shielding layer when a sealing layer is introduced on the other surface of the porous support. The present invention is based on this discovery.

In addition, in view of the above-described problems, the present invention provides a device for preparing a hydrogen separation membrane capable of stably growing a Pd-containing separation membrane for hydrogen gas separation as a plating solution grows from the top of a porous support to a uniform thickness by simply shielding the lower surface of the porous support without applying complicated procedures such as separately depressurizing the lower surface of the porous support.

A first aspect of the present invention provides a method for preparing a hydrogen separation membrane including: a first step of preparing a porous support; a second step of preparing a Pd-containing layer comprised of Pd-containing particles on a first surface of the porous support directly or on a porous shielding layer located on the first surface of the porous support; a third step of introducing a sealing layer that blocks the absorption of an electroless plating solution on a second surface of the porous support; a fourth step of forming a Pd-containing dense membrane from the Pd-containing particles of the Pd-containing layer by immersing the porous support provided with the Pd-containing layer on the first surface and the sealing layer on the second surface in a Pd-containing electroless plating solution; and a fifth step of removing the sealing layer from the porous support.

The second step and the third step may be carried out in consecutive order or in reverse order.

A second aspect of the present invention provides a hydrogen separation membrane prepared by the first aspect, which is provided with a porous support; selectively a porous shielding layer located on a first surface of the porous support; and a Pd-containing metal separation membrane on the first surface of the porous support directly or on the porous shielding layer located on the first surface of the porous support, wherein the Pd-containing metal separation membrane forms a Pd-containing dense membrane from Pd-containing particles by electroless plating, and the Pd-containing dense membrane is formed by growing from the Pd-containing particles toward the first surface of the porous support.

A third aspect of the present invention provides a method for preparing hydrogen including a step of separating hydrogen using the hydrogen separation membrane according to the second aspect.

As a step carried out prior to or at the same time with the hydrogen separation step described above, a step of forming hydrogen through a steam reforming reaction, a partial oxidation reaction, an autothermal reforming reaction, a water-gas shift reaction or a decomposition reaction may be further included. In addition, the hydrogen separation step may include a step of separating hydrogen from hydrogen-containing gas that includes at least one component of water, carbon monoxide, carbon dioxide, methane and nitrogen in 1% or greater.

A fourth aspect of the present invention provides a device for purifying hydrogen provided with the hydrogen separation membrane according to the second aspect.

A fifth aspect of the present invention provides a device for preparing hydrogen combining a reactor that prepares hydrogen-containing gas by a reaction including one or more reactions selected from the group consisting of a steam reforming reaction, a decomposition reaction, a partial oxidation reaction and an autothermal reforming reaction of alcohols, ethers or hydrocarbons, and the device for purifying hydrogen according to the fourth aspect.

A sixth aspect of the present invention provides a device for preparing a hydrogen separation membrane (100) including a hollow-shaped housing (10); a shielding unit (20) separably binding to the bottom of the housing (10), and having a loading unit (25) formed on the upper surface in order to dispose a porous support (30); and an elastic body (40) disposed in a form to surround the porous support (30) and the loading unit (25).

In the device for preparing a hydrogen separation membrane (100) according to the present invention, the elastic body (40) preferably has a ring shape.

When the porous support (30) is disposed on the loading unit (25) of the shielding unit (20), the upper surface height of the porous support (30) is preferably the same as or less than the center height of the elastic body (40).

When the porous support (30) is disposed on the loading unit (25) of the shielding unit (20), the upper surface height of the porous support (30) is preferably higher than the center height of the elastic body (40).

The loading unit (25) is located higher than the upper surface of the shielding unit (20) except for the loading unit (25) by being formed extending from the upper surface of the shielding unit (20), and the diameter of the loading unit (25) is preferably smaller than the diameter of the upper surface of the shielding unit (20).

The shielding unit (20) includes a base (21) in which a groove (22) is formed on the outer surface at prescribed intervals, a binding unit (23) extending from the upper surface of the base (21), and the diameter of the binding unit (23) is preferably smaller than the diameter of the base (21).

A seventh aspect of the present invention provides a method for preparing a hydrogen separation membrane using the device for preparing a hydrogen separation membrane (100) according to the present invention, and the method includes a first step of preparing a porous support (30) and disposing the porous support in the device for preparing a hydrogen separation membrane (100); and a second step of forming a Pd-containing separation membrane (50) by supplying a Pd-containing electroless plating solution to the upper surface of the porous support (30).

Specifically, the first step may include 1) a step of disposing the porous support (30) in a loading unit (25) of the device for preparing a hydrogen separation membrane (100); 2) a step of disposing an elastic body (40) in a form to surround the porous support (30) and the loading unit (25); and 3) a step of locking a housing (10) and a shielding unit (20).

In the first step, the porous support (30) is provided with a porous shielding layer at the upper surface, and the lower surface of the porous support (30) and the loading unit (25) of the device for preparing a hydrogen separation membrane (100) may be tightly disposed to face each other.

In the first step, the porous support (30) is provided with a Pd-containing layer comprised of Pd-containing particles at the upper surface, and the Pd-containing particles are made of Pd or a Pd alloy, and the lower surface of the porous support (30) and the loading unit (25) of the device for preparing a hydrogen separation membrane (100) may be tightly disposed to face each other.

In the second step, the Pd-containing separation membrane (50) may grow from the upper surface of the porous support (30) to a uniform thickness.

An eighth aspect of the present invention provides a device for preparing a hydrogen separation membrane (100) including a hollow-shaped housing (10); a shielding unit (30) separably binding to the housing (10); and a seating unit (36) formed on the upper surface of the shielding unit (30) in order to dispose a porous support (40).

In the device for preparing a hydrogen separation membrane (100) according to the present invention, the shielding unit (30) preferably has a shape that the area decreases toward the top.

The seating unit (36) is preferably a stepped groove having a depth from the upper surface of the shielding unit (30).

When the porous support (40) is disposed on the seating unit (36), the height (d2) of the porous support (40) is preferably greater than the depth (d1) of the seating unit (36).

The depth (d1) of the seating unit (36) is preferably 5% to 95% of the height (d2) of the porous support (40).

The device (100) further includes a bottom cover (20) separably binding to the bottom of the housing (10); and the bottom cover (20) preferably includes an open top lower base (21); and a shielding unit binding structure (24) extending from the inner surface of the lower base (21) in a radius direction forming a prescribed thickness.

The device for preparing a hydrogen separation membrane (100) may preferably further include a top cover (50) separably binding to the top of the housing (10).

When the porous support (40) is disposed on the seating unit (36), the diameter of the porous support (40) is preferably smaller than the upper surface diameter of the shielding unit (30).

The bottom cover (20) and the shielding unit (30) are preferably formed in an integrated form as a single member.

A ninth aspect of the present invention provides a method for preparing a hydrogen separation membrane using the device for preparing a hydrogen separation membrane (100) according to the present invention, and the method includes a first step of preparing a porous support (40) and disposing the porous support in the device for preparing a hydrogen separation membrane (100); and a second step of forming a metal-containing separation membrane (60) by supplying a metal-containing electroless plating solution to the upper surface of the porous support (40).

Specifically, the first step includes 1) a step of disposing the porous support (40) in a seating unit (36) of the device for preparing a hydrogen separation membrane (100); and 2) a step of binding a housing (10) with a bottom cover (20), and in the step 2), it is preferable that the side surface of the seating unit (36) of a shielding unit (30) is pressurized to the porous support (40) side by an external inclined surface (33) of the shielding unit (30) adhering closely to the bottom inner side surface of the housing (10), and as a result, the side surface of the porous support (40) and the inner wall of the seating unit (36) are sealed.

In the first step, the porous support (40) may be provided with a porous shielding layer at the upper surface, and the lower surface of the porous support (40) and the seating unit (36) of the device for preparing a hydrogen separation membrane (100) may be tightly disposed to face each other.

In the first step, the porous support (40) may be provided with a Pd-containing layer comprised of Pd-containing particles at the upper surface, and the Pd-containing particles are formed of Pd or a Pd alloy, and the lower surface of the porous support (40) and the seating unit (36) of the device for preparing a hydrogen separation membrane (100) may be tightly disposed to face each other.

In the second step, the Pd-containing separation membrane (60) may be formed by supplying a Pd-containing electroless plating solution to the upper surface of the porous support (40).

In the second step, the metal-containing separation membrane (60) may grow from the upper surface of the porous support (40) to a uniform thickness.

BRIEF DESCRIPTION OF THE DRAWINGS

The objects and qualities of the present invention will become apparent from the following description of embodiments given in conjunction with the accompanying drawings, in which.

DETAILED DESCRIPTION OF THE EMBODIMENTS

Hereinafter, the present invention will be described in detail.

Figure 7:
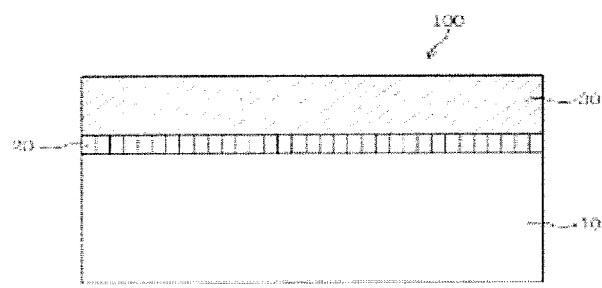
FIG. 7 is a mimetic diagram showing a general hydrogen separation membrane.

As shown by a diagram in FIG. 7, a hydrogen separation membrane (100) generally includes a porous support (10) made of metals or ceramics, a porous shielding layer (20) made of ceramics formed on the porous support (10), and a palladium-based metal separation membrane (30) formed on the porous shielding layer (20) and capable of separating hydrogen. In some cases, the porous shielding layer (20) may not be included. The porous support (10) may be a porous metal, porous ceramics or a porous metal coated with ceramics. Meanwhile, the shielding layer may be used as a bonding layer for providing favorable binding capacity between the porous support (10) and the metal separation membrane (30) while suppressing the diffusion between the porous support (10) and the metal separation membrane (30).

However, when a Pd-containing layer capable of acting as the metal separation membrane is formed on the porous support directly or on the porous shielding layer only using a physical vapor deposition method of palladium, multiple pin holes are formed in the Pd-containing layer, and therefore, a dense zero-defect hydrogen separation membrane that passes only hydrogen through without passing other substances through may not be prepared. In order to solve such a problem, electroless plating may be used for densification in order to remove the produced pin holes.

Figure 1:
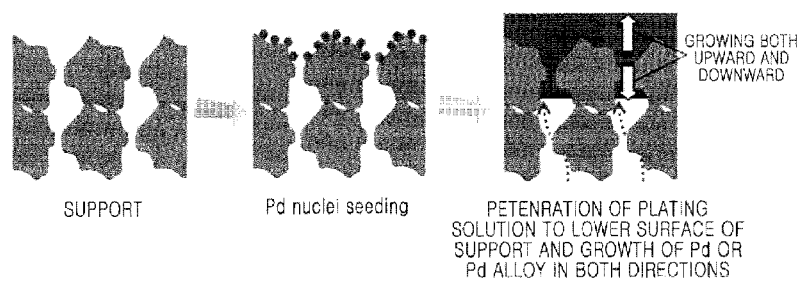
FIG. 1 is a mimetic diagram showing a process for preparing a separation membrane using an electroless plating method without introducing a sealing layer to a support as a comparative example.
Figure 5:
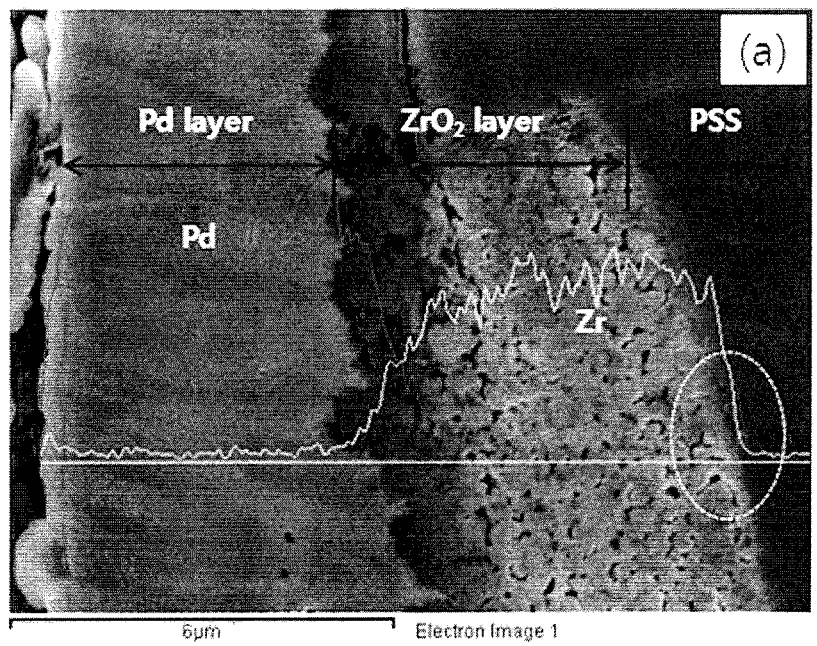
FIG. 5 is a result of EDX line scan analyzing the cross section of a hydrogen separation membrane prepared according to Comparative Example 1.

As shown by a diagram in FIG. 1, a Pd-containing layer comprised of Pd-containing particles is prepared on one surface of the porous support directly or on the porous shielding layer, and a Pd-containing dense membrane may be formed from Pd-containing particles through an electroless plating method for film densification. However, in this case, a plating solution also penetrates the opposite surface (a second surface) of the one surface (a first surface) of the porous support in which a metal separation membrane is formed, and the Pd-containing membrane is formed by growing both upward and downward from the Pd-containing particles, and as a result, a problem of Pd being plated on the porous support and/or the porous shielding layer is identified (FIG. 5). When Pd is plated on the porous support and the porous shielding layer, problems arise such that the membrane performances are seriously degraded since the permeation of hydrogen is disturbed due to the thickening of the Pd-containing separation membrane and the decrease of the active area. In addition, there is a problem in that the separation membrane lifespan is reduced due to the formation of a Pd or Pd alloy conducting wire inside the porous shielding layer.

Figure 2:
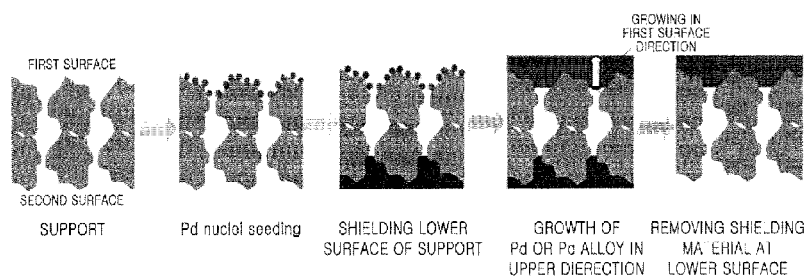
FIG. 2 is a mimetic diagram showing a process for preparing a separation membrane using an electroless plating method introducing a sealing layer to a support according to one example of the present invention.

As shown by a diagram in FIG. 2, when a sealing layer capable of blocking the absorption or the penetration of an electroless plating solution is introduced to the second surface of the porous support according to the present invention, a Pd-containing dense membrane mostly grows in the upward direction (the first surface direction) from the Pd-containing particles of the Pd-containing layer, and the growth in the porous support and/or the porous shielding layer direction is suppressed, and accordingly, the separation membrane thickness is reduced, the active area increases, and at the same time, Pd is not plated on the porous support and the porous shielding layer.

Figure 6:
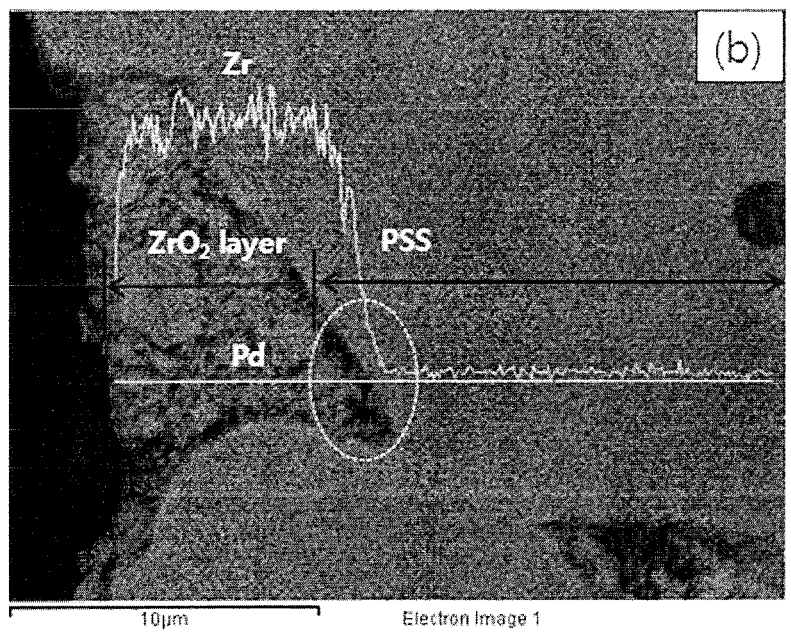
FIG. 6 is a result of EDX line scan analyzing the cross section of a hydrogen separation membrane prepared according to Example 1.

As shown by a diagram in FIG. 6, when the cross section of a separation membrane, which is prepared by electroless plating after introducing a sealing layer according to one example of the present invention, is analyzed by EDX line scan, a Pd peak does not appear in the porous shielding layer and the porous support, therefore, it is identified that Pd is not plated on the shielding layer and the support. On the other hand, when a separation membrane is prepared without introducing a sealing layer, a Pd peak appears in the shielding layer and the porous support (FIG. 5), and as a result, it is demonstrated that a separation membrane is difficult to function as a separation member by Pd being plated on a shielding layer and a porous support (Experimental Example 1).

As a result, in the present invention, a Pd-containing layer formed by sputtering may be formed to a dense membrane with no pin holes using an electroless plating method, and furthermore, a problem of Pd being plated on a porous support and a porous shielding layer, which may occur in electroless plating, may be solved.

A first aspect of the present invention provides a method for preparing a hydrogen separation membrane including: a first step of preparing a porous support; a second step of preparing a Pd-containing layer comprised of Pd-containing particles on a first surface of the porous support directly or on a porous shielding layer located on the first surface of the porous support; a third step of introducing a sealing layer that shields absorption of an electroless plating solution on a second surface of the porous support; a fourth step of forming a Pd-containing dense membrane from the Pd-containing particles of the Pd-containing layer by immersing the porous support provided with the Pd-containing layer on the first surface and the sealing layer on the second surface in a Pd-containing electroless plating solution; and a fifth step of removing the sealing layer from the porous support.

The hydrogen separation membrane according to the present invention may have a planar shape, but may also have a tubular shape so that any one of a chamber for collecting separated and diffused hydrogen or a reformed fuel reaction flow path is formed inside.

The first step is a step of preparing a porous support in which a separation membrane is to be formed.

The porous support may be made of metal or ceramics, and the metal may be selected from the group consisting of stainless steel, nickel and inconel, and the ceramics may be oxide-based ceramics based on one or more selected from the group consisting of Al, Ti, Zr and Si. In addition, the porous support may be silicon wafer.

A surface treatment process may be carried out on the porous support in order to adjust the surface roughness. The surface treatment method may include a polishing process such as chemical mechanical polishing (CMP) or a process using plasma.

The sizes of surface pores formed on the porous support are preferably not too big or not too small. For example, when the size of the surface pores of the porous support is less than 0.01 μm, the porous support has difficulty in functioning as a porous support since the permeability of the porous support itself is low. On the other hand, when the size of the surface pores is greater than 20 μm, the pore diameter becomes too big and there is a disadvantage in that the Pd-containing layer as a metal separation membrane needs to be thick. Therefore, the size of the surface pores of the porous support preferably ranges from 0.01 μm to 20 μm.

In order to properly adjust the surface pores of the porous support, the first surface of the porous support may be filled with particles smaller than gaps or micropores thereof. For example, the first surface of the porous support may be filled with particles such as $ZrO_2$ sub-micron powder.

Selectively, the porous shielding layer capable of being formed on the first surface of the porous support in the present invention may pass hydrogen through the pores/gaps, and may be comprised of ceramic materials. Nonlimiting examples of the shielding layer include oxide-based, nitride-based, carbide-based ceramics based on one or more selected from the group consisting of Ti, Zr, Al, Si, Ce, La, Sr, Cr, V, Nb, Ga, Ta, W and Mo. Preferably, oxide-based ceramic materials such as $TiO_y$, $ZrO_y$, $Al_2O_z$ ($1<y\leq2$ or $2<z\leq3$) are included. The shielding layer may be formed in a vacuum condition using a sputtering process with $M_xO_2$ (M is a metal) or $Al_2O_3$ as a target. Alternatively, the shielding layer may be formed by supplying an M metal plate or powder as a source with oxygen gas, oxidizing the evaporated M, and growing the result on the porous support in a column form.

The thickness of the shielding layer may be determined considering the preparation and working conditions of a hydrogen separation membrane. For example, when a working condition of 400° C. is considered, the shielding layer may be formed to a thickness of 100 to 200 nm when $TiO_y$ is formed as the shielding layer. The shielding layer may be formed to a thickness of 500 to 800 nm when $ZrO_y$ is formed as the shielding layer.

The second step is a step of preparing a Pd-containing layer comprised of Pd-containing particles on the first surface of the porous support directly or on the porous shielding layer located on the first surface of the porous support, and the Pd-containing particles may act as a seed later in electroless plating for forming a Pd-containing dense membrane.

A method for forming Pd-containing particles typically includes seeding using a wet method or seeding using a dry method such as a physical vapor deposition method (for example, sputtering). The method for forming Pd-containing particles is not particularly limited. However, when a Pd-containing seed layer is formed using a wet method, Pd is also seated inside the porous shielding layer, and furthermore, Pd is diffused also to the porous support when a hydrogen separation membrane is operating at high temperatures, therefore, the hydrogen separation membrane may not properly function. Consequently, using a dry method is more preferable.

Accordingly, the second step of the present invention may prepare a Pd-containing layer comprised of Pd-containing particles through sputtering, and the Pd-containing particles may include Pd or a Pd alloy.

The Pd alloy may be an alloy with Pd and one or more metals selected from the group consisting of Au, Ag, Cu, Ni, Ru and Rh. Moreover, the Pd-containing layer further including a Pd alloy layer different from each other such as Pd/Cu, Pd/Au, Pd/Ag and Pd/Pt as a multilayer structure is also included in the scope of the present invention.

The Pd-containing layer may be formed to have a thickness of 0.1 to 10 μm. When the thickness is 0.1 μm or less, there is an advantage in that hydrogen permeability is further improved, however, there is a problem in that preparing a metal separation membrane densely is difficult, which leads to the shortening of a metal separation membrane lifespan. When the thickness is 10 μm or greater, the membrane may be formed densely, however, hydrogen permeability may be relatively declined. In addition, total production costs of a hydrogen separation membrane increase when the metal separation membrane is formed to a thickness of 10 μm or greater using high-priced palladium. Considering the lifespan characteristics, the hydrogen permeability and the like of the metal separation membrane, forming to a thickness of 1 to 5 μm is preferable.

Due to hydrogen permeability characteristics through a separation membrane, higher hydrogen permeability is shown as the membrane is thinner, and therefore, it is preferable that the Pd-containing layer as a metal separation membrane is as thin as possible. The present invention may prepare a Pd-containing layer using sputtering, a physical deposition method, and the layer may be formed to be thin through this method, and moreover, a Pd-containing dense membrane is formed through an electroless plating method (the fourth step) that uses a plating solution, and consequently, a metal dense film having increased mechanical strength even with a small membrane thickness and having no defects such as pin holes.

The present invention may selectively further include a step 2a of polishing the Pd-containing layer after the second step. By polishing the Pd-containing layer formed using a seeding process of the second step, the pin hole numbers and sizes in the Pd-containing layer may be reduced, and accordingly, a more dense separation membrane may be formed, and as a result, a separation membrane performance may be more improved. The step 2a may use general polishing methods commonly used in the related technology fields, and the method is not particularly limited.

The third step is a step of introducing a sealing layer that blocks the absorption of an electroless plating solution on the opposite surface (a second surface) of the first surface of the porous support in which the Pd-containing layer is formed.

By introducing the sealing layer to the second surface of the porous support, a plating solution being absorbed or penetrating toward the second surface of the porous support in electroless plating of the fourth step may be blocked, and furthermore, gas (for example, air) collected inside the porous support being released to the second surface of the porous support due to the sealing layer may be suppressed, and therefore, the electroless plating solution introduced through the Pd-containing layer penetrating the porous support and the porous shielding layer may be suppressed. Consequently, Pd may not be plated on the porous support and the porous shielding layer.

The sealing layer may be comprised of a material capable of being present as a solid at a temperature (approximately 10 to 40° C.) of the electroless plating of the fourth step, and capable of being present as a liquid at temperatures higher than the temperature of the electroless plating, however, the material is not particularly limited. In other words, the material is not particularly limited as long as it is a material having a melting point higher than the temperature of electroless plating, however, with materials having melting points that are too high, it may be difficult to melt and apply the materials. Furthermore, the sealing layer may be formed by filling the pores/gaps of the second surface of the porous support using the materials.

Nonlimiting examples capable of forming the sealing layer may include any one selected from the group consisting of palmitic acid, stearic acid, oleic acid, linoleic acid, linolenic acid, paraffin wax, polyethylene wax, polyethylene glycol wax, nonane and decane, or a combination thereof. Moreover, various wax ingredients such as natural wax, mineral wax, artificial wax and prepared wax, which are present as solids at room temperature, may also be nonlimitedly included.

The sealing layer may be introduced by first melting the specific material capable of forming the sealing layer, applying this material on the second surface of the porous support, and then cooling and curing the result.

In one example of the present invention, the sealing layer is introduced by melting palmitic acid to a liquid state by heating at a temperature of 130° C., brushing the liquid on the second surface of the porous support, and cooling and curing the result to a solid state.

In the present invention, the second step and the third step may be carried out in consecutive order or in reverse order. The second step and the third step are steps each treating the first surface and the opposite second surface of the porous support, respectively, and are mutually independent steps, therefore, the order is not particularly limited.

The fourth step is a step of forming a Pd-containing dense membrane from the Pd-containing particles of the Pd-containing layer by immersing the porous support provided with the Pd-containing layer on the first surface and the sealing layer on the second surface in a Pd-containing electroless plating solution.

Specifically, in the fourth step, an electroless plating solution penetrates toward the first surface of the porous support, and a Pd-containing dense membrane may grow toward the first surface of the porous support from the Pd-containing particles of the Pd-containing layer. By introducing the sealing layer blocking the absorption or the penetration of the electroless plating solution on the second surface of the porous support through the third step, the electroless plating solution may penetrate toward the first surface excluding the second surface. Accordingly, a Pd-containing dense membrane may grow mostly toward the first surface of the porous support, that is, in the upward direction of the membrane from the Pd-containing particles formed through the second step (refer to FIG. 2).

Furthermore, by the Pd-containing dense membrane growing toward the first surface of the porous support from the Pd-containing particles of the Pd-containing layer, Pd may not be plated on the porous support and the porous shielding layer, and this is the same as the description given above. Particularly, when electroless plating is carried out without forming the sealing layer according to the present invention, there is a problem in that the plating is also progressed inside the pores of the porous support and the porous shielding layer thereby reduces the active area, however, in the preparation method according to the present invention, the membrane grows only upward, and therefore, the active area may be expanded to the whole surface of the separation membrane.

In the present invention, the meaning of Pd not being plated on the porous support and the porous shielding layer is that, as the EDX line scan result shown in FIG. 6, a Pd peak is not detected in the porous support and the porous shielding layer, and more specifically, a weight-based Pd concentration in the porous support and the porous shielding layer is 0.5% or less.

In the present invention, the fourth step may use general electroless plating methods commonly used in the related technology fields, and therefore, the conditions and the materials used are not particularly limited.

For example, by using a plating solution that does not include carbon, the separated hydrogen is not contaminated, and the performance degradation of a dense metal membrane may be prevented as well.

When a separation membrane is prepared by electroless plating palladium, $Na_2EDTA$ is generally used to synthesize a chelate compound, and herein, carbon included in the EDTA is deposited in the separation membrane, and causes performance degradation of the separation membrane and contamination of the separated hydrogen. Accordingly, using a plating solution for fundamentally eliminating carbon sources in electroless plating is preferable, and herein, electroless plating is preferably progressed adjusting the plating temperature to a range of 10 to 40° C. in order to increase the density, and the range is more preferably 15 to 25° C. in terms of economic efficiency and performances.

After the electroless plating, heat treatment may be carried out for 1 to 20 hours at a temperature of 450 to 550° C. and under a hydrogen-containing gas atmosphere in order to form Pd or a Pd alloy.

The fifth step is a step of removing the sealing layer from the porous support, and the sealing layer may be removed from the porous support by simply scraping the layer physically or carrying out additional chemical treatments. By removing the sealing layer, hydrogen gas permeating the metal separation membrane and passing through the porous support may escape out of the porous support.

A second aspect of the present invention provides a hydrogen separation membrane prepared by the first aspect, which is provided with a porous support; selectively a porous shielding layer located on a first surface of the porous support; and a Pd-containing metal separation membrane on the first surface of the porous support directly or on the porous shielding layer located on the first surface of the porous support, wherein the Pd-containing metal separation membrane forms a Pd-containing dense membrane from Pd-containing particles by electroless plating, and the Pd-containing dense membrane is formed by growing from the Pd-containing particles toward the first surface of the porous support.

The hydrogen separation membrane according to the second aspect may be prepared using the preparation method according to the first aspect, and accordingly, specific constitutions, terms and properties of the hydrogen separation membrane according to the second aspect are the same as those described above in the hydrogen separation membrane according to the first aspect.

In one example of the present invention, it is identified that the hydrogen separation membrane prepared by the first aspect exhibits hydrogen permeability 1.5 times higher than existing hydrogen separation membranes, and furthermore, the separation membrane is a stable membrane with no nitrogen leaks even at a temperature of 500° C. (Experimental Example 1). Consequently, the hydrogen separation membrane prepared using the method according to the present invention is useful in a hydrogen preparation process, a hydrogen purification process, and the like.

A third aspect of the present invention provides a method for preparing hydrogen including a step of separating hydrogen using the hydrogen separation membrane according to the second aspect.

When purified hydrogen is prepared, the hydrogen may be separated using the hydrogen separation membrane prepared by the method according to the present invention. Herein, a target to separate may include hydrogen-containing gas, and at least one component among water, carbon monoxide, carbon dioxide, methane and nitrogen may be included therein in 1% or greater in addition to hydrogen. This hydrogen-containing gas may be obtained using a reaction selected from the group consisting of a steam reforming reaction, a decomposition reaction, a partial oxidation reaction and an autothermal reforming reaction of alcohols, ethers, hydrocarbons, or at least one reaction among these reactions.

In other words, the hydrogen separation membrane prepared by the method according to the present invention may be used, for example, as a separation membrane for hydrogen separation in a hydrogenation or dehydrogenation reaction.

More specifically, hydrogen may be prepared through a steam reforming (SR) reaction (Reaction Formula 1), a partial oxidation (POx) reaction (Reaction Formula 2), an autothermal reforming (ATR) reaction (Reaction Formula 3) or a water-gas shift reaction (WGS) (Reaction Formula 4) that is a low exothermic reaction, as described in Reaction Formulae 1 to 4.

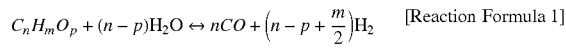
$$C_nH_mO_p + (n-p)H_2O \leftrightarrow nCO + \left(n - p + \frac{m}{2}\right)H_2 \quad \text{[Reaction Formula 1]}$$

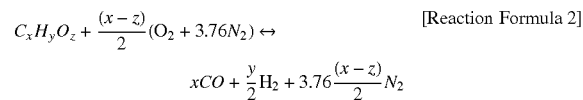
$$C_xH_yO_z + \frac{(x-z)}{2}(O_2 + 3.76N_2) \leftrightarrow xCO + \frac{y}{2}H_2 + 3.76\frac{(x-z)}{2}N_2 \quad \text{[Reaction Formula 2]}$$

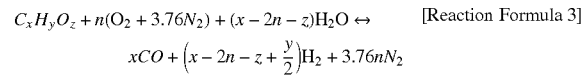
$$C_xH_yO_z + n(O_2 + 3.76N_2) + (x - 2n - z)H_2O \leftrightarrow xCO + \left(x - 2n - z + \frac{y}{2}\right)H_2 + 3.76nN_2 \quad \text{[Reaction Formula 3]}$$

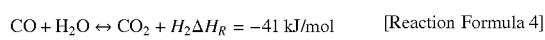
$$CO + H_2O \leftrightarrow CO_2 + H_2 \quad \Delta H_R = -41 \text{ kJ/mol} \quad \text{[Reaction Formula 4]}$$

The alcohols include methanol, ethanol, propanol and the like. For example, the hydrogen-containing gas obtained by a steam reforming reaction of methanol has a hydrogen concentration of approximately 65%, and water, carbon monoxide and carbon dioxide are normally present as coexisting gas. In addition, in a decomposition reaction of methanol, hydrogen and carbon monoxide are produced in the ratio of 2:1. As a result, the hydrogen concentration of the hydrogen-containing gas is approximately 65%, and coexisting gas is mainly carbon monoxide. A reaction combining a steam reforming reaction and a partial oxidation reaction includes an autothermal reforming reaction. For example, when hydrogen-containing gas is obtained by an autothermal reforming reaction using methanol, water and air as reaction raw materials, the hydrogen concentration is approximately 55%, and water, carbon monoxide, carbon dioxide and nitrogen are mainly present as coexisting gas.

The ethers include dimethyl ether, diethyl ether, methylethyl ether and the like. For example, in a steam reforming reaction of dimethyl ether, the hydrogen concentration is approximately 60%, and coexisting gas mainly includes water, carbon monoxide and carbon dioxide. In addition, dimethyl ether may be used for a decomposition reaction or an autothermal reforming reaction, which is the same as methanol.

The hydrocarbons include methane, ethane, city gas, kerosene, naphtha and the like. For example, a steam reforming reaction of methane is carried out at 700 to 800° C. The hydrogen concentration of the hydrogen-containing gas obtained thereby is approximately 60%, and water, carbon monoxide, carbon dioxide and methane are mainly present as coexisting gas. Methane may also be used for a decomposition reaction or an autothermal reforming reaction.

Meanwhile, an $H_2$ separation process connecting to a reforming and/or a water-gas shift reaction is carried out, for example, at an elevated temperature such as a reactor entry temperature of 700° C. and 400° C., respectively, and $H_2$ separation at or near these temperatures preferably uses a hydrogen separation membrane according to the present invention using a palladium-based metal separation membrane.

In addition, the hydrogen produced inside the reactor is progressed to the reproduction of methane by a reverse water reaction depending on the concentration of carbon monoxide and hydrogen, therefore, the conversion rate of methane is determined depending on the temperature. Accordingly, when hydrogen is removed from the product, a higher conversion rate of methane may be obtained, which eventually leads to lowering the reactor operation temperature and at the same time, excluding a latter purification process, and as a result, hydrogen may be economically prepared.

When a separation membrane is used in such a reactor, there is a disadvantage in that the separation membrane is damaged due to the catalyst formed inside the reactor, and frequent operation temperature and operation pressure changes, however, the hydrogen separation membrane of the present invention may provide proper mechanical strength even in such harsh environments.

A fourth aspect of the present invention provides a device for purifying hydrogen provided with the hydrogen separation membrane according to the second aspect.

A fifth aspect of the present invention provides a device for preparing hydrogen combining a reactor that prepares hydrogen-containing gas by a reaction including one or more reactions selected from the group consisting of a steam reforming reaction, a decomposition reaction, a partial oxidation reaction and an autothermal reforming reaction of alcohols, ethers or hydrocarbons, and the device for purifying hydrogen according to the fourth aspect.

Specific processes and constitutions for the device for purifying hydrogen and the device for preparing hydrogen are the same as those described in the method for preparing hydrogen, which is the third aspect.

Figure 10:
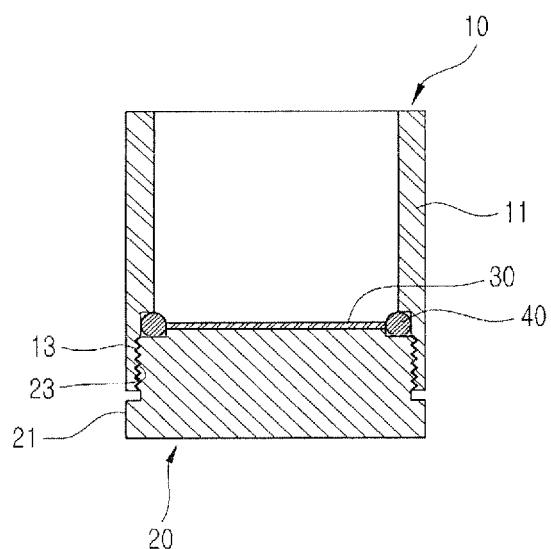
FIG. 10 is a cross-sectional view of FIG. 8.
Figure 11:
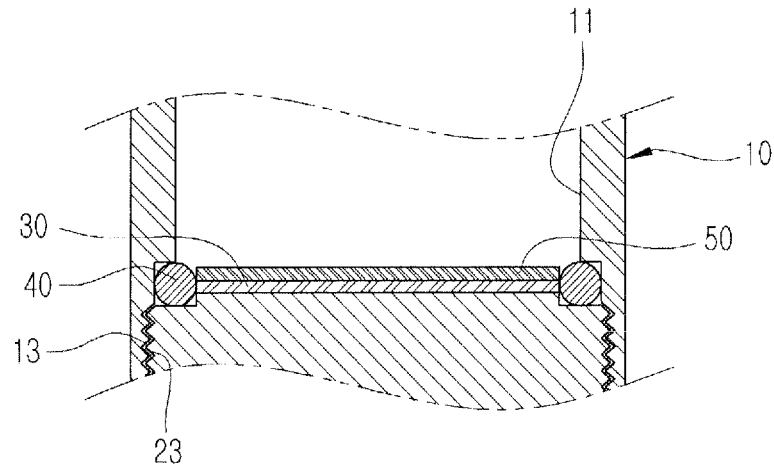
FIG. 11 is a constitutional diagram showing a process of hydrogen separation membrane formation according to one example of the present invention.

Meanwhile, as shown by a diagram in FIG. 10 and FIG. 11, a device for preparing a hydrogen separation membrane according to a sixth aspect of the present invention may simply shield the lower surface and the like except the upper surface of the porous support, and sealing may be achieved so that a plating solution does not leak to the surroundings of the upper surface of the porous support in electroless plating.

Figure 20:
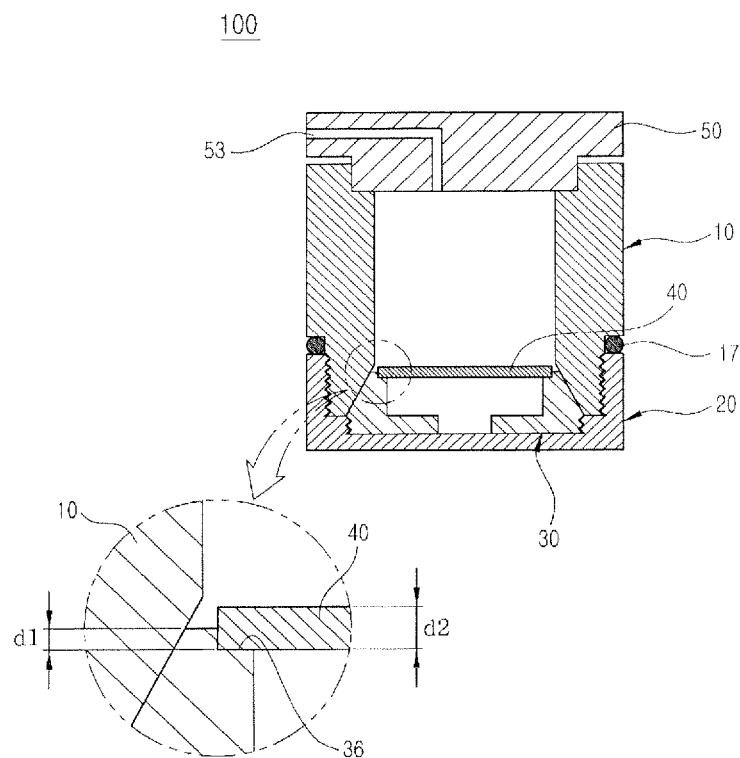
FIG. 20 is a cross-sectional view of FIG. 15.

In addition, as shown by a diagram in FIG. 20, a device for preparing a hydrogen separation membrane according to an eighth aspect of the present invention may simply shield the side surface, the lower surface and the like except the upper surface of the porous support, and sealing may be achieved so that a plating solution does not leak to the surroundings of the upper surface of the porous support in electroless plating.

Accordingly, the absorption or the penetration of an electroless plating solution to the lower surface of the support may be blocked, and a metal-containing separation membrane for hydrogen gas separation may stably grow from the upper surface of the porous support to a uniform thickness. As a result, when a hydrogen separation membrane is prepared through an electroless plating method using the device for preparing a hydrogen separation membrane of the present invention, the separation membrane thickness decreases, the active area increases, and at the same time, metals (for example, Pd) being plated on the porous support and the porous shielding layer may be prevented, and furthermore, existing complicated methods may be avoided.

Figure 8:
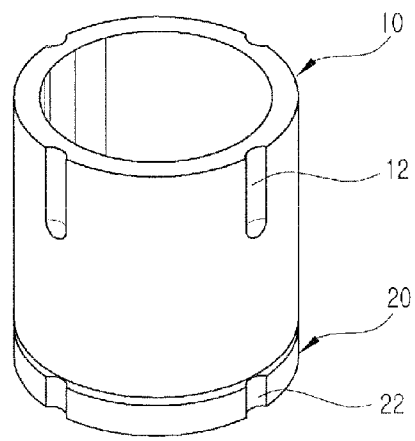
FIG. 8 is a perspective view of a device for preparing a hydrogen separation membrane according to examples of the present invention.
Figure 9:
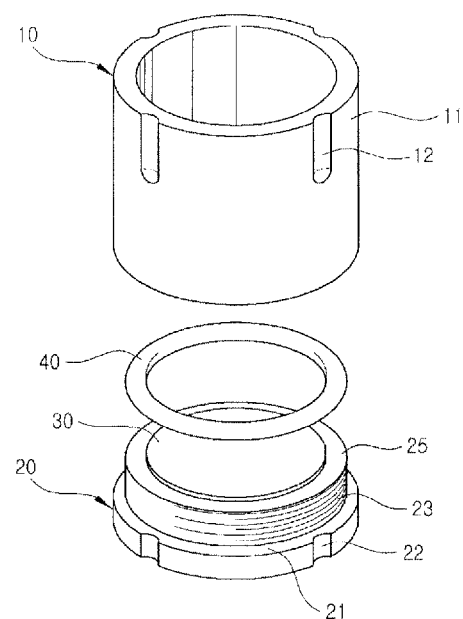
FIG. 9 is an exploded perspective view of the device for preparing a hydrogen separation membrane of FIG. 8.

With reference to FIG. 8 to FIG. 10, the whole structure of a device for preparing a hydrogen separation membrane (100) according to one example of the sixth aspect of the present invention will be examined.

The device for preparing a hydrogen separation membrane (100) according to the sixth aspect of the present invention largely includes a housing (10), a shielding unit (20) and an elastic body (40), and when a hydrogen separation membrane is prepared using the device, a porous support (30) prepared in advance may be disposed inside the device and used. Accordingly, the preparation device according to the present invention may be normally prepared and/or distributed without the porous support (30), however, the structure of the device including the porous support will be described.

More specifically, a device for preparing a hydrogen separation membrane (100) according to the sixth aspect of the present invention includes a hollow-shaped housing (10); a shielding unit (20) separably binding to the bottom of the housing (10), and having a loading unit (25) formed on the upper surface in order to dispose a porous support (30); and an elastic body (40) disposed in a form to surround the porous support (30) and the loading unit (25).

The housing (10) includes a hollowed body (11) with a hollow shape having a prescribed thickness between the inner surface and the outer surface, and a first groove (12) formed along the outer circumference surface of the body (11) at prescribed intervals. The shape of the housing (10) may be diverse depending on the underside shape of the porous support (30). For example, when the porous support (30) has a circular shape, the housing (10) may have a cylindrical shape, and when the porous support (30) has a polygonal shape, the housing (10) may have a corresponding polygonal column shape. Furthermore, the housing (10) may have any shape with an open top to which a plating solution may be introduced.

The housing (10) is formed to have a stepped form at the inner surface bottom side so that the elastic body may be disposed, and as one example, a female thread screw (13) is formed so as to enable the binding of the shielding unit (20) to the bottom side of the step. Meanwhile, as another example, the shielding unit (20) and the housing (10) may bind through screw connection after forming a flange therein, or the shielding unit (20) and the housing (10) may bind using a flange hold pin, a fastener, a clamp or the like.

The shielding unit (20) includes a base (21) in which a second groove (22) is formed on the outer circumference surface at prescribed intervals, a binding unit (23) extending from the upper surface of the base (21), and a loading unit (25) in order to dispose the porous support (30) on the upper surface while being disposed on the binding unit (23).

The loading unit (25) is part of the upper surface of the shielding unit (20), that is, the upper surface of the binding unit (23), and means a surface touching the porous support when the porous support (30) is disposed on the upper surface of the shielding unit (20). Accordingly, the loading unit (25) is not necessarily formed on the upper surface of the shielding unit (20) separately, but may be formed to have certain shapes and heights in order to better adhere to the porous support (30) and efficiently seal the porous support from the elastic body (40).

Preferably, the loading unit (25) is located higher than the upper surface of the shielding unit (20) except the loading unit (25) by being formed extending from the upper surface of the shielding unit (20), and the diameter of the loading unit (25) may be smaller than the diameter of the upper surface of the shielding unit (20). Particularly, by the loading unit (25) being formed on the upper surface of the binding unit (23) (this is the same as the upper surface of the shielding unit (20)) to a prescribed height, the loading unit may have a prescribed height difference than the upper surface except the loading unit (25), the shielding unit (20) may be formed to have a stepped upper surface.

Accordingly, the elastic body (40) to be described later may be more readily disposed around the loading unit (25) and the porous support (30). Through this, the lower surface and the surroundings of the porous support (30) may be favorably sealed. Furthermore, the loading unit (25) preferably has an identical diameter and shape with the porous support (30) to be disposed so that the loading unit is favorably adhered and sealed with the porous support (30).

The binding unit (23) forms a male thread screw so as to enable the binding with the housing (10). Meanwhile, as another example, the shielding unit (20) and the housing (10) may bind through screw connection after forming a flange therein, or the shielding unit (20) and the housing (10) may bind using a flange hold pin, a fastener, a clamp or the like.

The first groove (12) and the second groove (22) have a function to prevent the slip when binding or separating the housing (10) and the shielding unit (20), and in addition to this, enable one to judge the stable binding of the housing and the shielding unit through the fact that whether they are present in a row when binding.

The porous support (30), as described above, may be disposed on the upper surface of the shielding unit (20) when a hydrogen separation membrane is prepared. Specifically, the porous support (30) is disposed on the loading unit (25) present on the upper surface of the shielding unit (20). Accordingly, when the porous support (30) is disposed in the device according to the present invention, the porous support may be disposed to have a prescribed height from the upper surface of the binding unit (23), which is the same as the loading unit (25) described above, and the diameter of the support is smaller than the diameter of the upper surface of the shielding unit (20) (this is the same as the diameter of the upper surface of the binding unit (23)).

The elastic body (40) may have a structure of a ring shape with a prescribed thickness, and specifically, is placed on the upper surface of shielding unit (20) while adhering closely to the outer circumference surface of the porous support (30) and the loading unit (25). In other words, the internal diameter of the elastic body (40) before applying an external force may be smaller than the diameter of the porous support (30) or the loading unit (25), however, when an external force is applied, the elastic body is expanded and capable of being disposed around the porous support (30) and the loading unit (25). As described above, in order to prevent a plating solution from penetrating to the bottom of the porous support (30), the sizes and the shapes of the porous support (30) and the corresponding loading unit (25) are preferably identical, and therefore, the elastic body (40) may adhere closely to both and be disposed around them. In addition, by the loading unit (25) having a prescribed height difference with the upper surface of the shielding unit (20), a step is formed, and the elastic body (40) may be disposed more readily and strongly around them.

The elastic body (40) is not particularly limited as long as a material thereof may expand by an external force, and adhere closely to the porous support (30) and the loading unit (25), but is preferably a rubber elastic body, for example, a thermoplastic elastic body. For example, a styrene-based thermoplastic styrenic block copolymer (SBC), an olefin-based thermoplastic olefinic elastomer (TPO), urethane-based thermoplastic polyurethane (TPU), amide-based thermoplastic polyamide (TPAE) and a polyester-based thermoplastic engineering elastomer (TPEE) may be used as a thermoplastic elastic body. In addition to these, thermoplastic vulcanizates (TPV), thermoplastic rubber (TPR) and the like may be used.

As seen in FIG. 10, when the housing (10) and the shielding unit (20) are locked, the elastic body (40) has a structure of being pressurized by the step formed on the inner surface of the housing (10) at the top, and pressurized by the upper surface of the shielding unit (20) at the bottom (when the loading unit (25) is formed by extension, the elastic body may also be pressurized by the step formed therefrom). Through this, the elastic body is stably fixed inside the housing (10) and at the same time, sealing may be achieved so that a plating solution does not leak to the surroundings of the upper surface of the porous support in electroless plating.

Hereinafter, with reference to FIG. 11 to FIG. 14, examples relating to a method for preparing a hydrogen separation membrane using the device for preparing a hydrogen separation membrane (100) will be described.

A method for preparing a hydrogen separation membrane using the device for preparing a hydrogen separation membrane (100) according to the sixth aspect of the present invention includes a first step of preparing a porous support (30) and disposing the porous support in the device for preparing a hydrogen separation membrane (100); and a second step of forming a Pd-containing separation membrane (50) by supplying a Pd-containing electroless plating solution to the upper surface of the porous support (30).

Regarding the first step, a porous support (30) to be disposed in the device for preparing a hydrogen separation membrane (100) is prepared first. The prepared porous support (30) is disposed in the device according to the present invention when a hydrogen separation membrane is prepared. As a result, a Pd-containing separation membrane for hydrogen gas separation (50) due to electroless plating may grow on the support. The descriptions on the porous support and/or a shielding layer to be disposed in the device according to the present invention and to form a separation membrane are the same as those described in the first aspect of the present invention.

A Pd-containing layer comprised of Pd-containing particles may be introduced on the upper surface of the porous support directly or on a porous shielding layer located on the upper surface of the porous support. The method of forming the Pd-containing particles and the description on the Pd-containing layer are the same as those described in the first aspect of the present invention.

Furthermore, more specifically, the first step includes 1) a step of disposing the porous support (30) in a loading unit (25) of the device for preparing a hydrogen separation membrane (100); 2) a step of disposing an elastic body (40) in a form to surround the porous support (30) and the loading unit (25); and 3) a step of locking a housing (10) and a shielding unit (20).

The device for preparing a hydrogen separation membrane (100) and the constitutions relating to the device are the same as those described above.

Furthermore, with the porous support (30) disposed on the loading unit (25) as a center, all except the upper surface of the support may be simply shielded by the loading unit (25) adhering closely to the lower surface of the support at the bottom and by the elastic body (40) surrounding around the support on both sides, and therefore, sealing may be achieved so that a plating solution does not leak to the surroundings of the upper surface of the porous support in electroless plating.

In addition, by locking the housing (10) and the shielding unit (20), shielding such as above becomes stronger, and moreover, an electroless plating solution may be supplied only to the upper surface of the porous support since the housing has an open top hollow shape so as to introduce the electroless plating solution.

The second step is a step of forming a Pd-containing separation membrane (50) by supplying a Pd-containing electroless plating solution to the upper surface of the porous support (30) disposed on the loading unit (25) of the device for preparing a hydrogen separation membrane (100).

Due to the properties that may be shown when the porous support (30) is installed in the device for preparing a hydrogen separation membrane (100), the Pd-containing separation membrane (50) grows only upward of the support thereby may grow from the upper surface of the porous support (30) to a uniform thickness.

The Pd-containing hydrogen separation membrane (50), which is formed using an electroless plating solution used in the present invention, may have a Pd alloy membrane form. Pd may be used in a palladium complex form. In addition, transition metals are used as an alloy metal of the Pd metal, and the transition metals may include group 8 elements such as Pt, Rh, Ir, Fe, Co and Ni; group 1b elements such as Cu, Ag and Au; group 6A elements such as Cr, Mo and W; group 4A elements such as Ti and Zr; and group 5 elements such as Ta, Nb and V. The transition metals may be used in ion compound forms so as to facilitate the alloy between the Pd and the transition metals.

The growth and the formation of the Pd-containing separation membrane (50) due to the supply of a Pd-containing electroless plating solution in the second step is progressed on the upper surface of the porous support (30). Accordingly, when the porous support (30) is provided with a porous shielding layer on the surface, the Pd-containing separation membrane (50) growing on the porous shielding layer is preferable, therefore, the part provided with the porous shielding layer is employed as the upper surface of the porous support (30), and the lower surface of the porous support (30), which is the opposite side, is tightly disposed to face the loading unit (25) of the device for preparing a hydrogen separation membrane (100).

As described above, when the porous support (30) is provided with a Pd-containing layer comprised of Pd-containing particles on the surface, the Pd-containing separation membrane (50) growing from the Pd-containing layer is preferable, therefore, the part provided with the Pd-containing layer is employed as the upper surface of the porous support (30), and the lower surface of the porous support (30), which is the opposite side, is tightly disposed to face the loading unit (25) of the device for preparing a hydrogen separation membrane (100).

As described above, the porous support (30) may be provided with both the porous shielding layer and the Pd-containing layer, and in this case, the Pd-containing layer is preferably formed on the porous shielding layer.

The electroless plating method carried out through the second step, the plating conditions and the like may be carried out by adding a Pd-containing electroless plating solution according to commonly used methods in the related technology fields, and are not particularly limited.

Figure 13:
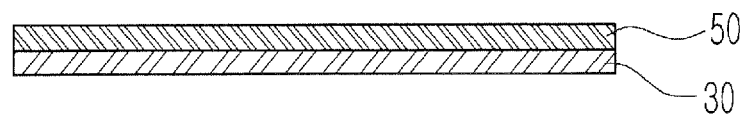
FIG. 13 is a diagram showing forms of a porous support and a hydrogen separation membrane according to FIG. 11.

In FIG. 11 and FIG. 13, the formation of a Pd-containing separation membrane (50) according to a first example is shown by a diagram.

First, a porous support (30) is set and disposed so that the upper surface is not higher than the center height of an elastic body (40). In other words, the upper surface height of a porous support (30) is disposed to be the same as or less than the center height of an elastic body (40). For that, those skilled in the art may properly select the center height of the elastic body (40), the height of a loading unit (25) formed at the top of a shielding unit (20) or the height of the porous support (30). In other words, a Pd-containing separation membrane (50) formed when an electroless plating solution is supplied to the upper surface of the porous support (30) while the side upper surface of the porous support (30) adheres to the elastic body (40) has a property to grow only upward of the porous support (30).

More specifically, by the porous support (30) being shielded by the loading unit (25) at the bottom and by the elastic body (40) at the surroundings, the electroless plating solution being absorbed or penetrated toward the lower surface of the porous support (30) may be blocked, and furthermore, gas (for example, air) collected in the porous support (30) being released toward the lower surface of the porous support (30) due to the shielding of the surroundings may be suppressed, and therefore, the electroless plating solution introduced to the upper surface of the support penetrating inside the porous support (30) may be suppressed. Particularly, this is different from existing methods of depressurizing one side of a support, and the present invention may prevent an electroless plating solution from deeply penetrating inside a support by maintaining the internal surface pressure of the porous support (30).

As a result, when the method for preparing a hydrogen separation membrane according to the present invention is used, Pd may not be plated inside the porous support (30). Accordingly, when electroless plating is carried out on the porous support without the device for preparing a hydrogen separation membrane (100) of the present invention, there is a problem in that the plating is also progressed inside the pores of a porous support and/or a porous shielding layer thereby reduces the active area, however, when the device for preparing a hydrogen separation membrane (100) according to the present invention is used, a Pd-containing separation membrane (50) grows only upward of the support, and therefore, the active area may be expanded to the whole surface of the separation membrane.

FIG. 13 separately shows the shape of a porous support (30) and a Pd-containing separation membrane (50) formed only upward of the porous support (30). As shown above, the Pd-containing separation membrane (50) according to the first example may prepare a separation membrane formed with a uniform thickness in general.

Figure 12:
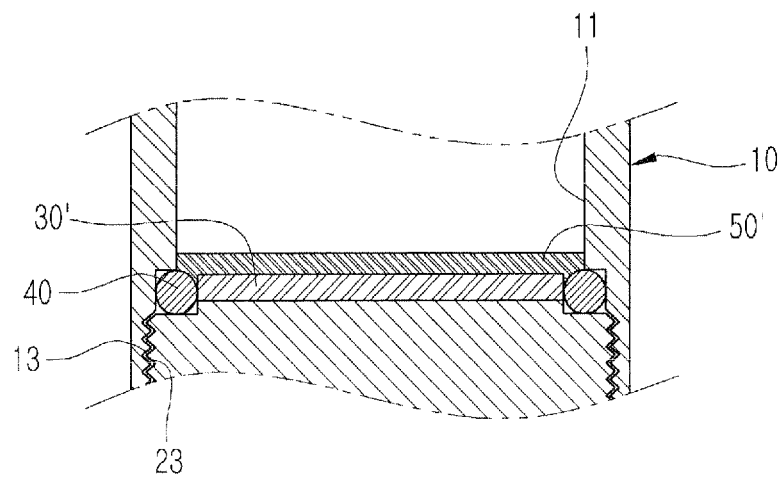
FIG. 12 is a constitutional diagram showing a process of hydrogen separation membrane formation according to another example of the present invention.
Figure 14:
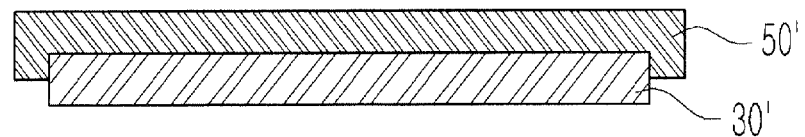
FIG. 14 is a diagram showing forms of a porous support and a hydrogen separation membrane according to FIG. 12.
Figure 15:
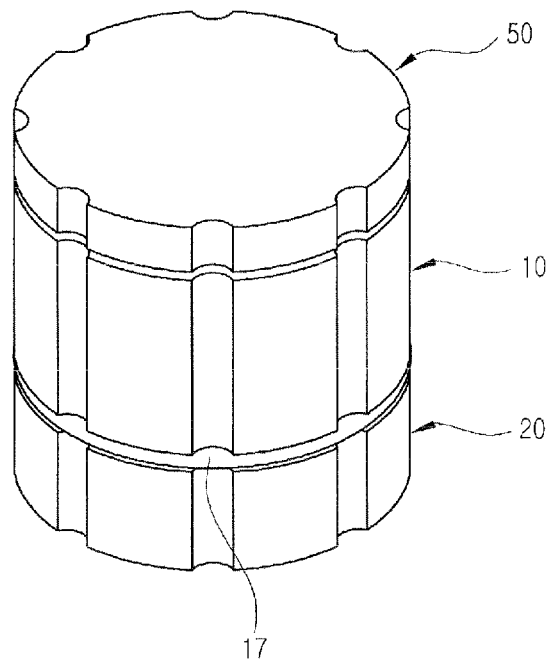
FIG. 15 is a perspective view of a device for preparing a hydrogen separation membrane according to examples of the present invention.
Figure 16:
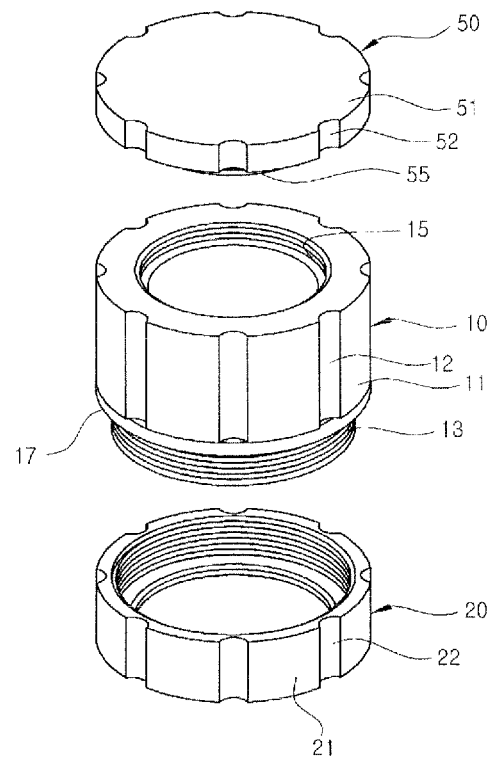
FIG. 16 is an exploded perspective view of the device for preparing a hydrogen separation membrane of FIG. 15.
Figure 17:
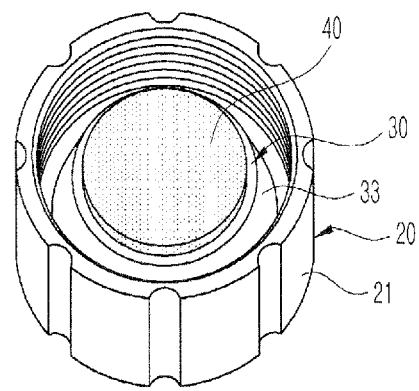
FIG. 17 is a perspective view showing a state of a shielding unit binding to a bottom cover.
Figure 18:
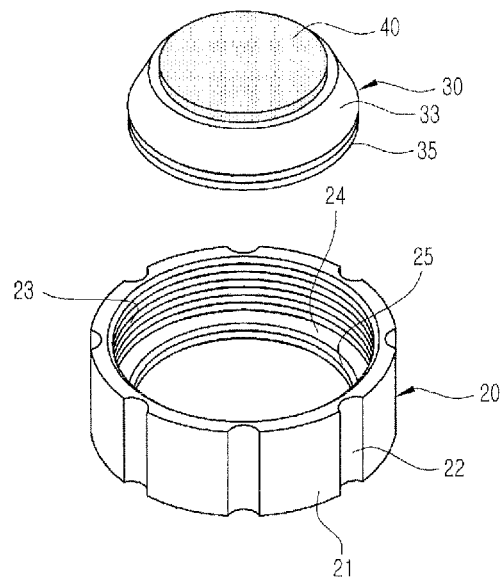
FIG. 18 is an exploded perspective view of FIG. 17.
Figure 19:
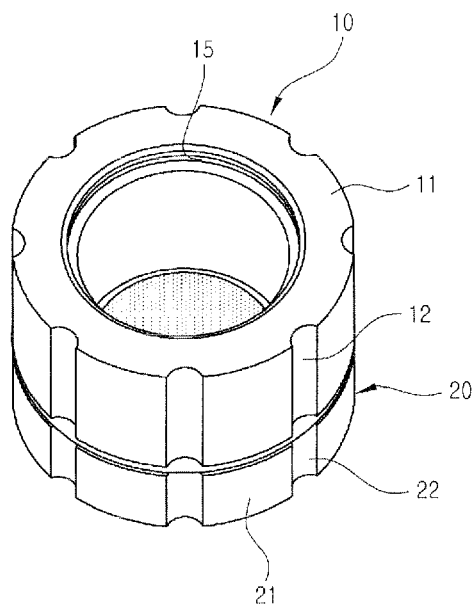
FIG. 19 is a perspective view of a state in which a top cover is removed in FIG. 15.

FIG. 12 and FIG. 14 show the formation of a hydrogen separation membrane (50') according to a second example.

A porous support (30') is set so that the upper surface is higher than the center height of an elastic body (40). In other words, a hydrogen separation membrane, which is formed when a plating solution is supplied through the top of the porous support (30') with a part of the side surface of the porous support (30') adhering closely to the elastic body (40) while the side upper surface does not adhere, has a property to grows in the upper and the side direction of the porous support (30').

FIG. 14 separately shows the shape of a porous support (30') and a Pd-containing separation membrane (50') formed only in the upper and the side direction of the porous support (30'). As shown above, the Pd-containing separation membrane (50') according to the second example is formed with a uniform thickness in general, and it is identified that both side surfaces have a form extending downward to a prescribed distance.

As described above, when a Pd separation membrane is prepared using a Pd-containing plating solution, the device for preparing a hydrogen separation membrane of the present invention simply shields the bottom of a porous support, and thereby is capable of stably growing a Pd-containing separation membrane for hydrogen gas separation as a plating solution grows from the upper surface of the porous support to a uniform thickness.

In addition, in the process for preparing a hydrogen separation membrane, the lower surface and the surroundings except the upper surface of the porous metal support may be shielded in a simple manner, and therefore, production efficiency may be maximized.

With reference to FIG. 15 to FIG. 20, the whole structure of a device for preparing a hydrogen separation membrane (100) according to one example of the eighth aspect of the present invention will be examined.

The device for preparing a hydrogen separation membrane (100) according to the eighth aspect of the present invention largely includes a housing (10), a bottom cover (20) and a shielding unit (30), and when a hydrogen separation membrane is prepared using the device, a porous support (40) prepared in advance may be disposed inside the device and used. Accordingly, the preparation device according to the present invention may be normally prepared and/or distributed without the porous support (40), however, the structure of the device including the porous support will be described.

More specifically, a device for preparing a hydrogen separation membrane (100) according to the eighth aspect of the present invention includes a hollow-shaped housing (10); a bottom cover (20) separably binding to the bottom of the housing (10); a shielding unit (30) separably binding to the bottom cover (20); and a seating unit (36) formed on the upper surface of the shielding unit (30) in order to dispose a porous support (40). Meanwhile, the bottom cover (20) and the shielding unit (30) may be present as a separated member, however, may be prepared as an integrated single member through a molding method such as injection molding.

The housing (10) includes a hollowed body (11) with a hollow shape having a prescribed thickness between the inner surface and the outer surface, and includes a first groove (12) formed along the outer circumference surface of the body (11) at prescribed intervals. The shape of the housing (10) may be diverse depending on the underside shape of the porous support (40). For example, when the porous support (40) has a circular shape, the housing (10) may have a cylindrical shape, and when the porous support (40) has a polygonal shape, the housing (10) may have a corresponding polygonal column shape. Furthermore, the housing (10) may have any shape with an open top to which a plating solution may be introduced.

The housing (10) may be formed to have a stepped form from the outer surface bottom to the inner side so as to enable the binding with the bottom cover (20), and a male thread screw (13) is formed on the outer circumference surface toward the bottom side of the step. Meanwhile, a female thread screw (15) is formed at the top inner circumference surface of the housing (10) so as to enable the binding with the top cover (50). In addition, as another example, the bottom cover (20) and the housing (10) may bind through screw connection after forming a flange therein, or the bottom cover (20) and the housing (10) may bind using a flange hold pin (or a clamp).

In the stepped part of the housing (10), a ring-shaped sealing member (17) is disposed. The sealing member (17) functions to prevent the leak through the binding site when the housing (10) and the bottom cover (20) bind, and is preferably an elastic member. Meanwhile, the sealing member (17) may be selectively applied, and may not be included in the device for preparing a hydrogen separation membrane (100) of the present invention.

The bottom cover (20) includes a lower base (21) formed with a second groove (22) at prescribed intervals on the outer surface, and a shielding unit binding structure (24) extending to a prescribed distance in a radius direction while having a prescribed thickness from the inner surface bottom of the lower base (21). A female thread screw (25) is formed on the inner circumference surface of the binding structure (24) so as to enable the binding with the shielding unit (30). In addition, as another example, the shielding unit (30) and the binding structure (24) may bind through screw connection after forming a flange therein, or the shielding unit (30) and the binding structure (24) may bind using a flange hold pin (or a clamp).

Meanwhile, on the inner surface top of the bottom cover (20), a female thread screw (23) binding to the male thread screw (13) on the outer circumference surface of the housing (10) is formed. Alternatively, as described above, A flange corresponding to the bottom cover (20) is formed, and the bottom cover (20) and the housing (10) may bind using screw connection or a hold pin.

The top cover (50) includes an upper base (51) formed with a third groove (52) at prescribed intervals on the outer surface, and a housing binding structure (55) extending to a prescribed distance from the upper base (51). A male thread screw is formed on the inner circumference surface of the binding structure (55) so as to enable the binding with the housing (10). Meanwhile, as another example, the binding structure (55) and the housing (10) may bind through screw connection after forming a flange therein, or the binding structure (55) and the housing (10) may bind using a flange hold pin (or a clamp).

Meanwhile, when electroless plating is carried out using the device for preparing a hydrogen separation membrane (100) of the present invention, by-product gas such as nitrogen may be produced, and as one example, a discharge hole (53) passing through the lower surface and the side surface of the top cover (50) may be formed in order to discharge the by-product gas, however, the device is not limited thereto.

The top cover (50) is not an essential component to exhibit a function (for example, preparing a hydrogen separation membrane) of the device for preparing a hydrogen separation membrane (100) according to the present invention, but may play a role to prevent the contamination of the inside of the device for preparing a hydrogen separation membrane (100) when the device is stored, and to prevent the drying of a solution in electroless plating. In other words, the top cover may be applied to the device according to the present invention as a sort of a lid.

Herein, the first groove (12), the second groove (22) and the third groove (52) have a function to prevent the slip when binding or separating the housing (10), the bottom cover (20) and the top cover (50), and in addition to this, enable to judge the stable binding of the housing, the bottom cover and the top cover through the fact whether they are present in a row when binding.

The shielding unit (30) may separably bind to the binding structure (24), and have a shape that the area decreases toward the top. In other words, as one example, an external inclined surface (33) of the shielding unit (30) has a shape inclining toward the bottom, and may have a shape in which the diameter gradually increases as going from top to bottom.

The seating unit (36) is formed on the upper surface of the shielding unit (30) so as to dispose the porous support (40). The seating unit (36) may be defined as a stepped groove having a depth (d1) from the upper surface of the shielding unit (30). The porous support (40) may be disposed on the seating unit (36) matching to the stepped groove, and furthermore, may favorably seal the side surface and the lower surface of the porous support (40) when the housing (10) and the bottom cover (20) bind. Moreover, the seating unit (36) preferably has a diameter and a shape identical to or slightly bigger than the porous support (40) to be disposed so as to favorably adhering closely to the porous support (40) and be favorably sealed.

The porous support (40) may be disposed on the seating unit (36) of the shielding unit (30) when a hydrogen separation membrane is prepared. As one example, the diameter of the porous support (40) may be formed to be smaller than the diameter of the seating unit (36). Herein, in the process of binding the housing (10) to the bottom cover (20), the binding is achieved while the bottom inner side surface of the housing (10) and the external inclined surface (33) of the shielding unit (30) are in contact with each other, therefore, the side of the porous support (40) and the inner wall of the seating unit (36) may be sealed by strong pressure since the bottom inner side of the housing (10) pressurizes the top side surface of the shielding unit (30). Meanwhile, the shielding unit (30) is preferably a flexible elastic member.

When the porous support (40) is disposed on the seating unit (36), the height d2 of the porous support (40) may be greater than the depth d1 of the seating unit (36). Preferably, the depth d1 of the seating unit (36) may be maintained at a ratio of 5% to 95% of d2. Through the structure, space available for forming a hydrogen separation membrane may also be created on the side surface of the porous support (40) when a plating solution is supplied to the top of the porous support (40). However, a plating solution may not penetrate the portion sealed by the inner wall of the seating unit (36) (side surface connecting from the lower surface of the porous support (40)), and therefore, a plating solution may not penetrate inside the support except the upper surface portion of the porous support (40).

In the present invention, as described above, an elastic material may be used as the material forming the sealing member (17) or the shielding unit (30), and particularly for the shielding unit (30), the material is not particularly limited as long as it is a material of which shape is capable of being modified by external pressure and at the same time, strongly sealing the side surface of the porous support (40), however, Teflon or a rubber elastic body may be typically included considering preparation easiness. For example, a thermoplastic elastic body is preferable. Nonlimiting examples of the thermoplastic elastic body are the same as those described in the sixth aspect of the present invention.

Hereinafter, with reference to FIG. 20 to FIG. 21, examples relating to a method for preparing a hydrogen separation membrane using the device for preparing a hydrogen separation membrane (100) will be described.

A method for preparing a hydrogen separation membrane using the device for preparing a hydrogen separation membrane (100) according to the eighth aspect of the present invention includes a first step of preparing a porous support (40) and disposing the porous support in the device for preparing a hydrogen separation membrane (100); and a second step of forming a metal-containing separation membrane (60) by supplying a metal-containing electroless plating solution to the upper surface of the porous support (40).

Regarding the first step, a porous support (40) to be disposed in the device for preparing a hydrogen separation membrane (100) is prepared first. The prepared porous support (40) is disposed in the device according to the present invention when a hydrogen separation membrane is prepared. As a result, a metal-containing separation membrane for hydrogen gas separation (60) due to electroless plating may grow on the support. Hereinafter, more detailed descriptions on the porous support and/or a shielding layer to be disposed in the device according to the present invention and to form a separation membrane are the same as those described in the first aspect of the present invention.

Furthermore, a Pd-containing layer comprised of Pd-containing particles may be introduced on the upper surface of the porous support directly or on a porous shielding layer located on the upper surface of the porous support. The Pd-containing particles may act as seeds in electroless plating for forming a Pd-containing separation membrane (60).

The method of forming the Pd-containing particles and the description on the Pd-containing layer are the same as those described in the first aspect of the present invention.

Furthermore, more specifically, the first step includes 1) a step of disposing the porous support (40) in a seating unit (36) of the device for preparing a hydrogen separation membrane (100); and 2) a step of locking a housing (10) and a bottom cover (20). Herein, in the step 2), the side surface of the seating unit (36) of a shielding unit (30) is pressurized to the porous support (40) side by adhering closely the external inclined surface (33) of the shielding unit (30) and the bottom inner side surface of the housing (10), and as a result, the side surface of the porous support (40) and the inner wall of the seating unit (36) may be sealed. Through this, all except the upper surface of the support may be simply shielded, and therefore, sealing may be achieved so that a plating solution does not leak to the surroundings of the upper surface of the porous support in electroless plating.

By locking the housing (10) and the bottom cover (20), sealing of the support through the shielding unit (30) becomes stronger, and furthermore, the electroless plating solution may be supplied only to the upper surface of the porous support (40) since the housing (10) has an open top hollow shape so as to introduce the electroless plating solution.

The device for preparing a hydrogen separation membrane (100) and constitutions relating to the device are also the same as those described above.

The second step is a step of forming a metal-containing separation membrane (60) by supplying a metal-containing electroless plating solution to the upper surface of the porous support (40) disposed on the seating unit (36) of the device for preparing a hydrogen separation membrane (100). One preferably example of the metal includes Pd.

Due to the properties that may be shown when the porous support (40) is installed in the device for preparing a hydrogen separation membrane (100), the metal-containing separation membrane (60) grows only upward of the support thereby may grow from the upper surface of the porous support (40) to a uniform thickness.

In the present invention, in the second step, a Pd-containing separation membrane (60) may be formed by supplying a Pd-containing electroless plating solution to the upper surface of the porous support (40). In other words, the metals capable of being used in a hydrogen separation membrane are not particularly limited, however, growing a Pd-containing separation membrane (60) using a Pd-containing electroless plating solution may be preferable.

The growth and the formation of the metal-containing separation membrane (60) due to the supply of a metal-containing electroless plating solution in the second step is progressed on the upper surface of the porous support (40). Accordingly, when the porous support (40) is provided with a porous shielding layer on the surface, the metal-containing separation membrane (60) growing on the porous shielding layer is preferable, therefore, the part provided with the porous shielding layer is employed as the upper surface of the porous support (40), and the lower surface of the porous support (40), which is the opposite side, is tightly disposed to face the seating unit (36) of the device for preparing a hydrogen separation membrane (100).

As described above, when the porous support (40) is provided with a Pd-containing layer comprised of Pd-containing particles on the surface, the Pd-containing separation membrane (60) growing from the Pd-containing layer is preferable, therefore, the part provided with the Pd-containing layer is employed as the upper surface of the porous support (40), and the lower surface of the porous support (40), which is the opposite side, is tightly disposed to face the seating unit (36) of the device for preparing a hydrogen separation membrane (100).

As described above, the porous support (40) may be provided with both the porous shielding layer and the Pd-containing layer, and in this case, the Pd-containing layer is preferably formed on the porous shielding layer.

The electroless plating method carried out through the second step, the plating conditions and the like may be carried out by adding a Pd-containing electroless plating solution according to commonly used methods in the related technology fields, and are not particularly limited.

Figure 21:
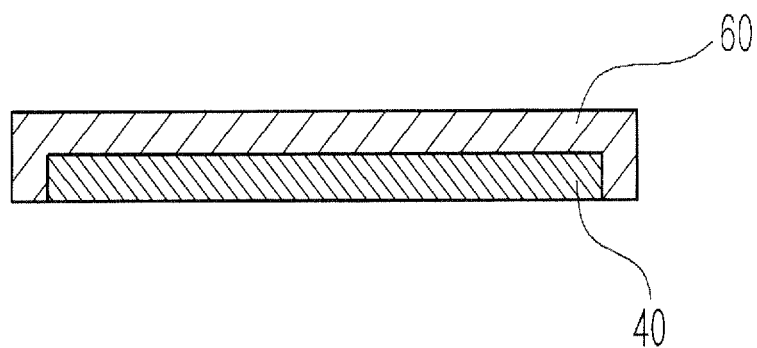
FIG. 21 is a diagram showing forms of a porous support and a hydrogen separation membrane according to FIG. 20.

In FIG. 20 and FIG. 21, the formation of a Pd-containing separation membrane (60) according to the examples of the present invention is shown by a diagram.

First, a porous support (40) is disposed on a seating unit (36) formed on the upper surface of a shielding unit (30), and the height (d2) of the porous support (40) is selected to be greater than the depth (d1) of the seating unit (36). After that, a bottom cover (20) bound to the shielding unit (30) binds to a housing (10). Through the bonding, an external inclined surface (33) of the shielding unit (30) may form a structure adhering closely to the bottom inner side surface of the housing (10). In this process, the side surface of the seating unit (36) of the shielding unit (30) is pressurized to the porous support (40) side, and as a result, the side surface of the porous support (40) and the inner wall of the seating unit (36) may be sealed by strong pressure. In other words, the metal-containing separation membrane (60) formed when an electroless plating solution is supplied to the upper surface of the porous support (40) grows only upward of the porous support (40).

More specifically, by the side surface and the lower surface of the porous support (40) being shielded by the seating unit (36), an electroless plating solution being absorbed or penetrated toward the lower surface of the porous support (40) may be blocked, and furthermore, gas (for example, air) collected in the porous support (40) being released to the lower surface of the porous support (40) due to the shielding of the surroundings may be suppressed, and therefore, the electroless plating solution introduced to the upper surface of the support penetrating inside the porous support (40) may be suppressed. Particularly, this is different from existing methods of depressurizing one side of a support, and the present invention may prevent an electroless plating solution from deeply penetrating inside a support by maintaining the internal pressure of the porous support (40).

As a result, in a method for preparing a hydrogen separation membrane according to the present invention, metal (for example, Pd) may not be plated inside the porous support (40). Therefore, when electroless plating is carried out on a porous support without the device for preparing a hydrogen separation membrane (100) of the present invention, there is a problem in that the plating is also progressed inside the pores of the porous support and/or the porous shielding layer thereby reduces the active area, however, when the device for preparing a hydrogen separation membrane (100) according to the present invention is used, a metal-containing separation membrane (60) grows only upward of the support, and therefore, the active area may be expanded to the whole surface of the separation membrane.

FIG. 21 separately shows the shape of a porous support (40) and a metal-containing separation membrane (60) formed only upward of the porous support (40). As shown above, the metal-containing separation membrane (60) according to the example may prepare a separation membrane formed with a uniform thickness in general.

As described above, when a metal separation membrane is prepared using a metal-containing plating solution, the device for preparing a hydrogen separation membrane of the present invention simply shields the bottom of the porous support, and thereby is capable of stably growing a metal-containing separation membrane for hydrogen gas separation as a plating solution grows from the upper surface of the porous support to a uniform thickness.

In addition, in the process for preparing a hydrogen separation membrane, the lower surface and the surroundings except the upper surface of the porous metal support may be shielded in a simple manner, and therefore, production efficiency may be maximized.

The device for preparing a hydrogen separation membrane of the present invention may be prepared either in an integrated form or separately. In addition, the device may be used without including a few components depending on the application types.

Hereinafter, the present invention will be described in more detail with reference to examples. However, these examples are for illustrative purposes only, and the scope of the present invention is not limited to these examples.

Example 1

Preparation of Hydrogen Separation Membrane with Sealing Layer Introduction

A first surface at the top of a porous stainless steel support was filled with $ZrO_2$ sub-micron powder. Subsequently, a porous shielding layer was formed by sputtering $ZrO_2$. Next, Pd particles were coated to a thickness of 4 micron on the surface of the support formed with the shielding layer using sputtering (175 W DC power, coating chamber vacuum level 20 mtorr, Ar 30 ml/min supply, sample rotation rate 20 rpm, coating temperature 600° C.)

Meanwhile, 10 g of palmitic acid was placed in a beaker and the beaker was placed on a hot plate, and then the palmitic acid was melted to a liquid state by setting the hot plate temperature at 130° C. The melted palmitic acid was brushed on the opposite surface (a second surface) of the porous support to treat the opposite surface with palmitic acid. After that, the palmitic acid was cooled and cured to introduce a sealing layer comprised of palmitic acid.

After that, a Pd electroless plating solution shown in Table 1 was prepared, and the porous support prepared above was plated at room temperature by being immersed in the solution.

TABLE 1

| Components | Content |
| --- | --- |
| $PdCl_2$ | 3.2 g/l |
| $NH_3H_2O$ (28%) | 320 ml/l |
| HCl | 4.0 ml/l |
| $N_2H_4$ (1%) | 200 ml/l |

After carrying out electroless plating, the sealing layer introduced to the second surface of the porous support was scraped off and removed from the porous support, and lastly, a hydrogen separation membrane according to the present invention was prepared.

Comparative Example 1

Preparation of Hydrogen Separation Membrane without Sealing Layer Introduction

A hydrogen separation membrane was prepared in the same manner as in Example 1 except for a process of introducing a sealing layer comprised of palmitic acid to the opposite surface of a porous support and a last process of scraping off the sealing layer.

In other words, a hydrogen separation membrane was prepared by filling and sputtering a porous stainless steel support using $ZrO_2$ sub-micron powder, introducing a Pd-containing layer comprised of Pd-containing particles by sputtering, and then electroless plating using a Pd electroless plating solution shown in Table 1.

Experimental Example 1

Figure 3:
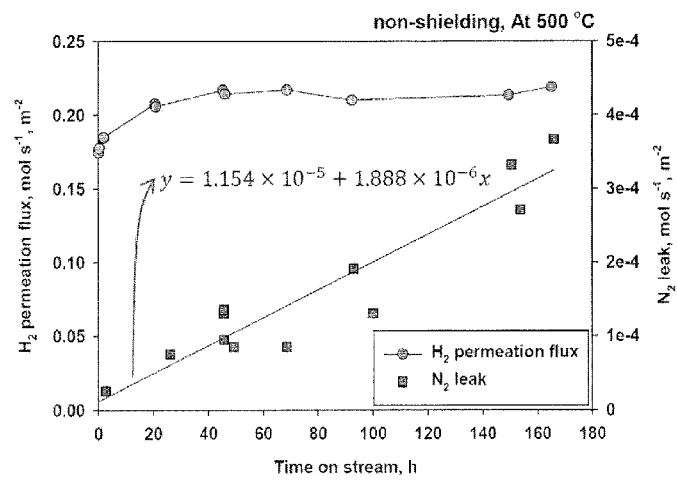
FIG. 3 is hydrogen permeability and nitrogen leak test results for a hydrogen separation membrane prepared in Comparative Example 1.
Figure 4:
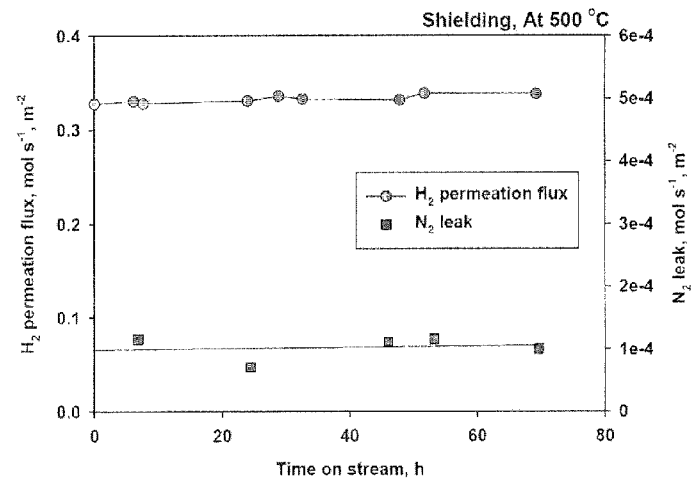
FIG. 4 is hydrogen permeability and nitrogen leak test results for a hydrogen separation membrane prepared in Example 1.

For the hydrogen separation membrane prepared in Example 1 and Comparative Example 1, hydrogen permeability was measured under a condition of 500° C. and 1 atm, and the results are shown in FIG. 3 (Comparative Example 1) and FIG. 4 (Example 1).

It was identified that the separation membrane prepared by electroless plating after introducing a sealing layer to a support according to Example 1 has a hydrogen permeability coefficient of 1.5 times higher compared to the separation membrane prepared without introducing a sealing layer to a support according to Comparative Example 1. This result is due to the fact that, in Comparative Example 1, electroless plating is carried out without introducing a sealing layer, therefore, a plating solution penetrates the opposite surface (a second surface) of a support, and a Pd-containing membrane grows both upward and downward, and as a result, Pd is plated on the porous support and the porous shielding layer thereby interrupts the hydrogen permeation. On the other hand, in Example 1, a Pd-containing membrane grows only upward of the shielding layer resulting in the thinning of the membrane, and the active area may expand to the whole surface of the separation membrane, and the hydrogen permeation may be smoothly progressed since Pd is not plated on the porous support and the porous shielding layer.

Furthermore, when leaks were checked using nitrogen, the hydrogen separation membrane according to Comparative Example 1 had increased nitrogen leaks when operating for a long time (FIG. 3). This is also due to the fact that the plating solution penetrates and a Pd conducting wire is formed inside the porous shielding layer, and consequently, diffusion between the porous support and the separation membrane occurs leading to gradual generation of pin holes. On the other hand, it was identified that the hydrogen separation membrane according to Example 1 had no nitrogen leaks over time (FIG. 4), and the separation membrane was capable of being stably operated.

Experimental Example 2

The cross sections of the hydrogen separation membranes prepared according to Example 1 and Comparative Example 1 were analyzed by EDX line scan, and the results are shown in FIG. 5 (Comparative Example 1) and FIG. 6 (Example 1), respectively.

In the separation membrane prepared without introducing a sealing layer according to Comparative Example 1, a Pd peak was clearly detected in the porous support layer (PSS) (white dotted line area of FIG. 5), and Pd being plated on the corresponding portion was identified. On the other hand, in the separation membrane prepared by carrying out electroless plating after introducing a sealing layer to a support according to Example 1, a Pd peak was not detected at all on the porous support and the porous shielding layer, and it was identified that Pd was not plated.

Based on the above, in the separation membrane according to Example 1, it can be seen that Pd is not plated on a porous support and a porous shielding layer by introducing a sealing layer during a preparation process, and a high-performance separation membrane, in which the membrane is thinned since a Pd-containing membrane grows only upward of the shielding layer, and the active area expands to the whole surface of the separation membrane, is obtained.

According to a method for preparing a hydrogen separation membrane of the present invention, when introducing a sealing layer capable of blocking the absorption and the penetration of an electroless plating solution to the opposite surface of the porous support (a second surface), Pd may not be plated on the porous support and a porous shielding layer when a Pd-containing dense membrane by electroless plating is formed. Accordingly, a hydrogen separation membrane having an increased active area and a decreased separation membrane thickness at the same time, and improved hydrogen permeability may be provided.

In addition, the device for preparing a hydrogen separation membrane of the present invention may stably grow a metal-containing separation membrane for hydrogen gas separation as a plating solution grows from the upper surface of a porous support to a uniform thickness by simply shielding the side surface and/or the lower surface of the porous support. Through this, a complicated method of depressurizing one surface of a porous support as an existing method used to prevent the penetration of a plating solution to the bottom of the porous support may be avoided.

What is claimed is:

1. A method of preparing a hydrogen separation membrane, comprising the steps of:
    applying a first seed layer containing Pd particles onto a first surface of a porous support, said porous support having gas collected therein;
    applying a second sealing layer onto a second surface of said porous support different than said first surface, said sealing layer operable to block the absorption of an electroless Pd plating solution on said second surface;
    immersing said porous support having said first and second layers thereon into a Pd-containing electroless plating solution, and preferentially plating a dense Pd membrane on said seed layer applied to said first surface while suppressing the growth of Pd membrane on said porous support and said sealing layer, said growth-suppressing step comprising inhibiting the release of said collected gas to said second surface; and
    removing said sealing layer from said second surface.

2. The method of claim 1, there being a porous shielding layer on said first surface of the porous support, said first layer being applied to said shielding layer.

3. The method of claim 1, said first seed layer being initially applied to said porous support, followed by application of said second sealing layer thereto.

4. The method of claim 1, wherein the first surface of the porous support is filled with particles having sizes smaller than the gas or micropores thereof.

5. The method of claim 1, said first layer is applied by sputtering said seed layer onto said first surface, said Pd-containing particles of Pd or a Pd alloy.

6. The method of claim 1, wherein said application of said sealing layer comprises filling pores or gaps of said second surface using a material present as a solid at a temperature of the electroless plating, and present as a liquid at temperatures higher than the temperature of the electroless plating.

7. The method of claim 6, wherein said filling material includes any one material selected from the group consisting of palmitic acid, stearic acid, oleic acid, linoleic acid, paraffin wax, polyethylene wax, polyethylene glycol wax, nonane, decane, and combinations thereof.

8. A hydrogen separation membrane prepared by the method of claim 1.

* * * * *